US009462896B2

(12) United States Patent
Reichert et al.

(10) Patent No.: US 9,462,896 B2
(45) Date of Patent: *Oct. 11, 2016

(54) DOOR FOR A REFRIGERATED MERCHANDISER

(71) Applicant: Hussmann Corporation, Bridgeton, MO (US)

(72) Inventors: Craig S. Reichert, Saint Charles, MO (US); Timothy D. Anderson, Saint Louis, MO (US)

(73) Assignee: Hussmann Corporation, Bridgeton, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/076,509

(22) Filed: Mar. 21, 2016

(65) Prior Publication Data

US 2016/0198866 A1  Jul. 14, 2016

Related U.S. Application Data

(63) Continuation of application No. 12/613,339, filed on Nov. 5, 2009, now Pat. No. 9,289,079.

(51) Int. Cl.
*A47F 3/04* (2006.01)
*B23P 19/00* (2006.01)

(52) U.S. Cl.
CPC ............. *A47F 3/043* (2013.01); *A47F 3/0434* (2013.01); *B23P 19/00* (2013.01)

(58) Field of Classification Search
CPC .................................................. A47F 3/0434
USPC ............. 312/116, 114, 138.1, 405; 52/171.3, 52/786.11, 171.2; 49/501, DIG. 1
See application file for complete search history.

(56) References Cited

U.S. PATENT DOCUMENTS 2,504,520 A    4/1950  Greiling
3,359,573 A   12/1967  Casebolt
(Continued)

OTHER PUBLICATIONS

Ingersoll Rand Climate Control Technologies, Hussmann Lifeline Premier Series brochure, May 4, 2009. 6 pages.

*Primary Examiner* — Daniel J Troy
*Assistant Examiner* — Andres Gallego
(74) *Attorney, Agent, or Firm* — Michael Best & Friedrich LLP

(57) ABSTRACT

A door for a refrigerated merchandiser defining a product display area. The door includes a first glass panel, a second glass panel, and a third glass panel. The first glass panel is in communication with an environment surrounding the refrigerated merchandiser, and has a first surface arranged to face the environment and a second surface opposite the first surface. The second glass panel is positioned adjacent the first glass panel, and has a third surface arranged to face the second surface and a fourth surface opposite the third surface. The third glass panel is positioned adjacent the second glass panel and is in communication with the product display area. The third glass panel has a fifth surface arranged to face the fourth surface and a sixth surface opposite the fifth surface and arranged to face the product display area. The door also includes a split-silver low-emissivity coating covering at least a portion of the third surface or the fourth surface, and a conductive film covering at least a portion of the fifth surface or the sixth surface. The conductive film is connected to a power supply to heat the third glass panel and to at least one of inhibit and remove condensation on at least one of the first glass panel and the third glass panel.

17 Claims, 3 Drawing Sheets

(56) References Cited

U.S. PATENT DOCUMENTS

| | | |
|---|---|---|
| 3,457,138 A | 7/1969 | Miller |
| 3,710,074 A | 1/1973 | Stewart |
| 4,035,608 A | 7/1977 | Stromquist et al. |
| 4,069,630 A | 1/1978 | Chess et al. |
| 4,477,129 A | 10/1984 | Heaney |
| 4,733,504 A | 3/1988 | Lindgren |
| 5,059,458 A | 10/1991 | Goodall |
| 5,329,736 A | 7/1994 | Sodervall |
| 5,374,116 A | 12/1994 | Borgen et al. |
| 5,615,040 A | 3/1997 | Watanabe |
| 5,852,284 A | 12/1998 | Teder et al. |
| 6,048,621 A | 4/2000 | Gallego et al. |
| 6,367,223 B1 | 4/2002 | Richardson et al. |
| 6,472,032 B1 | 10/2002 | Asano |
| 6,547,346 B2 | 4/2003 | Topper et al. |
| 6,606,832 B2 | 8/2003 | Richardson et al. |
| 6,606,833 B2 | 8/2003 | Richardson et al. |
| 6,655,760 B1 | 12/2003 | Sakata et al. |
| 6,790,494 B2 | 9/2004 | Asano et al. |
| 6,830,791 B1 | 12/2004 | Misonou et al. |
| 7,553,527 B2 | 6/2009 | Minaai |
| 2002/0064610 A1 | 5/2002 | Misonou |
| 2002/0078654 A1 | 6/2002 | Richardson et al. |
| 2004/0028845 A1 | 2/2004 | Asano et al. |
| 2004/0035086 A1 | 2/2004 | Minaai et al. |
| 2004/0222724 A1 | 11/2004 | Cording |
| 2006/0005484 A1 | 1/2006 | Riblier et al. |
| 2006/0103269 A1 | 5/2006 | Artwohl et al. |
| 2006/0207218 A1 | 9/2006 | Minaai et al. |
| 2006/0260229 A1 | 11/2006 | McKinlay et al. |
| 2008/0069983 A1 | 3/2008 | Minaai |
| 2008/0218039 A1 | 9/2008 | Messere et al. |
| 2009/0072679 A1 | 3/2009 | Avila et al. |

DOOR FOR A REFRIGERATED MERCHANDISER

CROSS-REFERENCE TO RELATED APPLICATIONS

This application is a continuation of and claims priority to U.S. application Ser. No. 12/613,339 filed Nov. 5, 2009, now U.S. Pat. No. 9,289,079, the entire contents of which are incorporated herein by reference.

BACKGROUND

The present invention relates to refrigerated merchandisers and, more particularly, to glass doors for refrigerated merchandisers.

Refrigerated merchandisers generally include a case defining a product display area for supporting and displaying food products to be visible and accessible through an opening in the front of the case. Refrigerated merchandisers are generally used in retail food store applications such as grocery or convenient stores or other locations where food product is displayed in a refrigerated condition. Some refrigerated merchandisers include doors to enclose the product display area of the case and reduce the amount of cold air released into the surrounding environment. The doors typically include one or more glass panels, allowing a consumer to view the food products stored inside the case.

Refrigerated merchandisers may be susceptible to condensation forming on the glass panel of the door, which obstructs viewing of the food product positioned inside the case. Condensation typically forms on the outer surface of the glass panel due to a cool outer surface being in communication with the ambient environment. In addition, fog can form on the inside surface of the panel due to the inner surface generally being in communication with the relatively cold product display area and then being exposed to the relatively humid air of the ambient environment when the door is opened.

Some existing doors use a high-wattage heated coating applied to an inner surface of the glass panel that is in communication with the surrounding environment to inhibit or remove condensation on the outermost surface of the door. Similar high-wattage heated coatings are typically used on the glass panel that is adjacent the product display area to inhibit or remove fog on the innermost surface of the door. These conventional doors often use a relatively high amount of heat energy (e.g., 200 Watts, 300 Watts, etc.) to remove condensation and fog on the innermost and outermost surfaces of the door. The high amounts of heat energy used with these doors are generally needed to overcome heat losses associated with heating portions of the door in addition to heating the glass panel.

Other existing doors do not use heat energy to limit formation of condensation on the door. Instead, these doors use a single silver low-emissivity coating on the outermost surface of the glass panel to limit formation of condensation on the outermost surface of the door. Fog often forms on the innermost surface of these doors without heat energy applied to the door. In addition, the timeframe for removing condensation and fog from the door increases after a door opening event due to a lack of heat energy applied to the door.

SUMMARY

In one construction, the invention provides a door for a refrigerated merchandiser defining a product display area. The door includes a glass assembly that has a first glass panel adapted to be in communication with an environment surrounding the refrigerated merchandiser, a second glass panel positioned adjacent the first glass panel, and a glass panel positioned adjacent the second glass panel and adapted to be in communication with the product display area. The first glass panel has a first surface that is arranged to face the environment and a second surface opposite the first surface. The second glass panel has a third surface that is arranged to face the second surface and a fourth surface opposite the third surface. The third glass panel has a fifth surface that is arranged to face the fourth surface and a sixth surface opposite the fifth surface. The sixth surface is arranged to face the product display area. The door also includes a film that has a split silver low-emissivity coating and that covers at least a portion of one or more of the first glass panel, the second glass panel, and the third glass panel.

In another construction, the invention provides a door for a refrigerated merchandiser that defines a product display area. The door includes a glass assembly that has a first glass panel, a second glass panel, and a third glass panel. The first glass panel is adapted to be in communication with an ambient environment surrounding the refrigerated merchandiser, and has a first surface arranged to face the environment and a second surface opposite the first surface. The second glass panel is positioned adjacent the first glass panel, and has a third surface arranged to face the second surface and a fourth surface opposite the third surface. The third glass panel is positioned adjacent the second glass panel and is adapted to be in communication with the product display area. The third glass panel has a fifth surface that is arranged to face the fourth surface and a sixth surface that is opposite the fifth surface and that is arranged to face the product display area. The door also includes a first film covering at least a portion of the second surface, a second film covering at least a portion of the fourth surface, and a third film covering at least a portion of the fifth surface.

In another construction, the invention provides a refrigerated merchandiser that includes a case defining a product display area for supporting food product, a refrigeration system in communication with the case, and at least one door coupled to the case. The at least one door includes a glass assembly that has a first glass panel in communication with an ambient environment surrounding the case, a second glass panel, and a third glass panel in communication with the product display area such that the second glass panel is positioned between the first glass panel and the third glass panel. The at least one door further includes a first film that covers at least a portion of the first glass panel and that has a split silver low-emissivity coating, a second film that covers at least a portion of the second glass panel and that has a split silver low-emissivity coating, and a third film that covers at least a portion of the third glass panel.

In yet another construction, the invention provides a method of manufacturing a door for a refrigerated merchandiser that defines a product display area and that is positioned in an ambient environment. The method includes covering at least a portion of a first glass panel of the door with a first film for reflecting radiated energy, covering at least a portion of a second glass panel of the door with a second film for reflecting radiated energy, and covering at least a portion of a third glass panel of the door with a third film for applying electrical energy from a power supply through the third film to heat at least the third glass panel. The method also includes assembling the first glass panel, the second glass panel, and the third glass panel into a glass assembly of the door such that the second glass panel is between the first glass panel and the third glass panel.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

Figure 1:
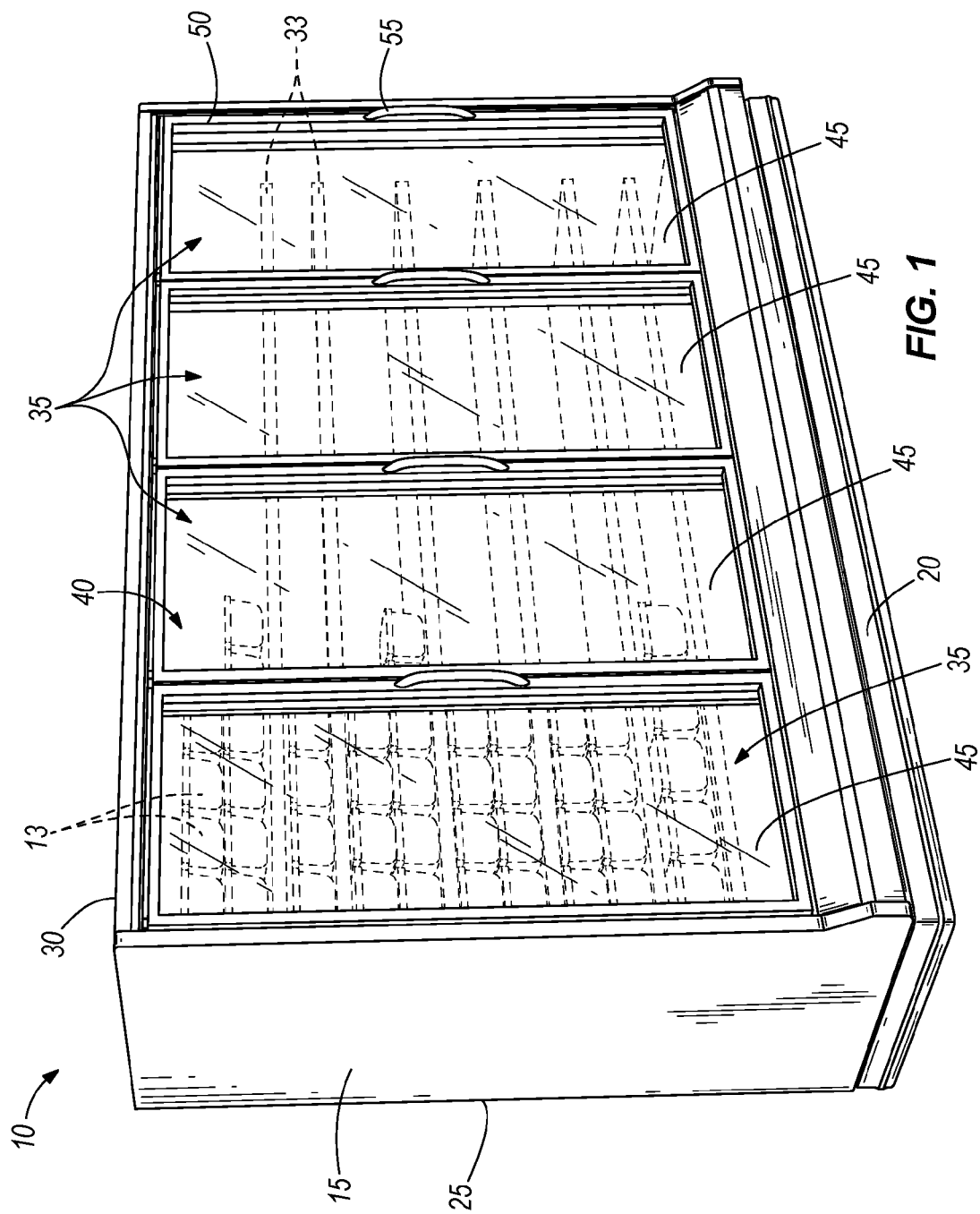
FIG. 1 is a perspective view of a refrigerated merchandiser embodying the invention.

FIG. 1 shows a refrigerated merchandiser 10 that may be located in a supermarket or a convenience store (not shown) for presenting fresh food, beverages, and other food product 13 to consumers. The refrigerated merchandiser 10 includes a case 15 having a base 20, a rear wall 25, and a canopy 30, and a plurality of doors 35 allowing access to the food product 13. The area partially enclosed by the base 20, the rear wall 25, and the canopy 30 defines a product display area 40 for supporting the food product 13 in the case 15. For example, the food product 13 can be displayed on racks or shelves 33 extending forwardly from the rear wall 25, and is accessible by consumers through the doors 35 adjacent the front of the case 15. As shown in FIG. 1, the food product 13 and the shelves 33 are visible behind the substantially transparent doors 35. In the illustrated construction, the refrigerated merchandiser 10 includes four doors 35. In other constructions, the refrigerated merchandiser 10 may include fewer or more doors 35 depending on the size of the case 15.

The refrigerated merchandiser 10 also includes a refrigeration system (not shown) in communication with the case 15 to provide refrigerated airflow to the product display area 40. The refrigeration system generally includes an evaporator located within an air passageway internal to the case 15. As is known in the art, the evaporator receives a saturated refrigerant that has passed through an expansion valve. The saturated refrigerant is evaporated as it passes through the evaporator as a result of absorbing heat from the airflow passing over the evaporator. The absorption of heat by the refrigerant allows the temperature of the airflow to decrease as it passes over the evaporator. The heated or gaseous refrigerant then exits the evaporator and is pumped back to one or more compressors (not shown) for re-processing into the refrigeration system. The cooled airflow exiting the evaporator via heat exchange with the liquid refrigerant is directed through the remainder of the air passageway and is introduced into the product display area 40 where the airflow will remove heat from and maintain the food product 13 at desired conditions.

Figure 2:
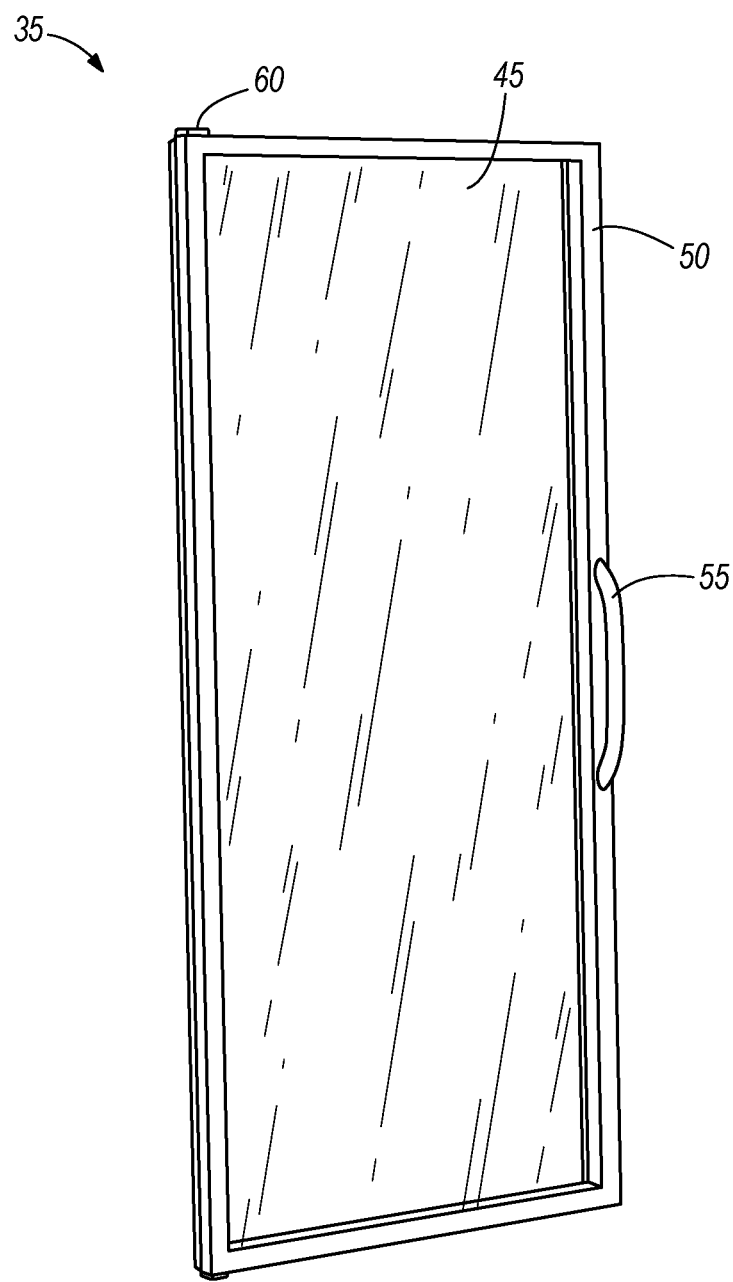
FIG. 2 is a front view of a door of the refrigerated merchandiser of FIG. 1.

FIG. 2 shows one door 35 of the refrigerated merchandiser 10. The door 35 includes a glass assembly 45, a frame 50, and a handle 55 to facilitate opening of the door 35. The frame 50 surrounds the perimeter of the glass assembly 45 and is constructed from a low thermal conductivity material (e.g., fiberglass). A hinge 60 is positioned on one side of the frame 50 to couple the door 35 to the case 15 such that the door 35 may be pivoted about the hinge 60 to allow access to the food product 13 stored within the case 15. Alternatively, the frame 50 may be slidingly engaged with a portion of the base 20 within a track in the case 15 such that sliding the door 35 within the track allows access to the food product 13.

Figure 3:
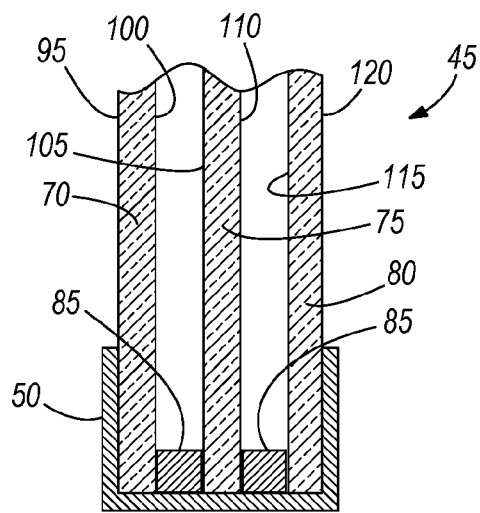
FIG. 3 is an enlarged cross-sectional view of a glass assembly of the door of FIG. 2.

The glass assembly 45 is secured to each door 35 by the frame 50 to allow viewing of the food product 13 from outside the case 15. FIG. 3 shows one construction of the glass assembly 45 engaged with the frame 50 and including a first glass panel 70, a second glass panel 75, and a third glass panel 80. In other constructions, the glass assembly 45 may include more or fewer than three glass panels. As shown in FIG. 3, the glass panels 70, 75, 80 are supported by the frame 50 and are spaced apart from each other by spacers 85. The edges of the glass panels 70, 75, 80 illustrated in FIG. 3 are substantially aligned with each other and engaged with an inner surface of the frame 50. In other constructions, the edges of one or more of the glass panels 70, 75, 80 may be offset from each other (e.g., offset in a vertical direction).

Figure 4:
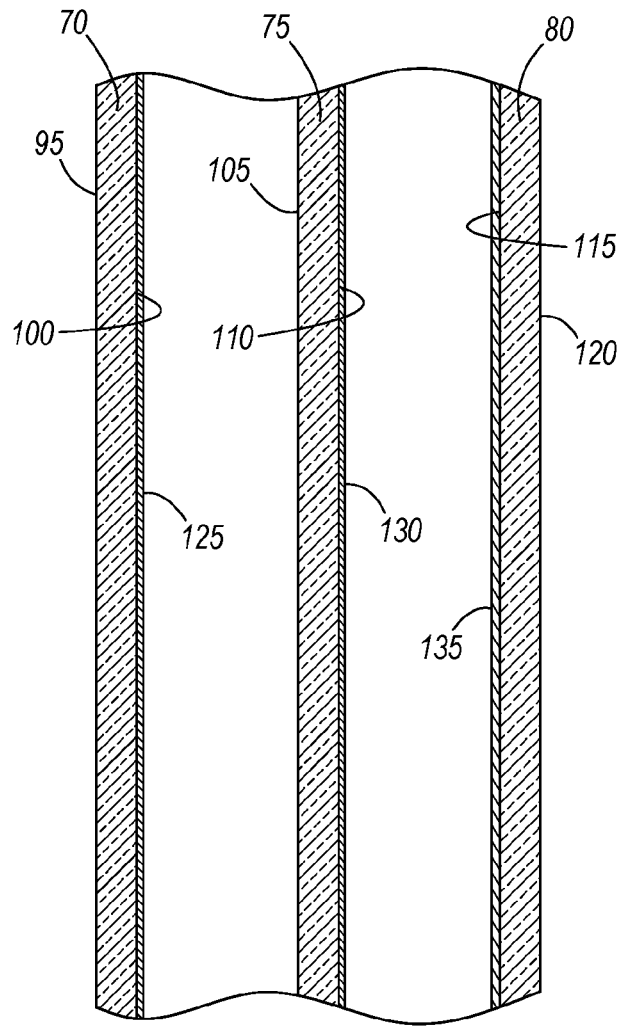
FIG. 4 is an enlarged cross-sectional view of the glass assembly of FIG. 3 including a first glass panel having a first film, a second glass panel having a second film, and a third glass panel having a third film.

FIGS. 3 and 4 show that the glass panels 70, 75, 80 are held in generally parallel, face-to-face positions relative to each other by the door frame 50. As viewed in FIGS. 3 and 4, the low temperature product display area 40 is positioned to the right of the glass assembly 45 and the frame 50, and the ambient environment is positioned to the left of the glass assembly 45 and the frame 50. The first glass panel 70 is located adjacent and in communication with an ambient environment surrounding the refrigerated merchandiser 10 (e.g., a store-side glass panel), and is formed from a tempered transparent or translucent glass. Alternatively, the first glass panel 70 can be formed of a variety of other materials including polycarbonate, acrylic, vinyl, or combinations thereof. The first glass panel 70 has a first surface 95 that is arranged to face outward from the case 15 (toward the ambient environment), and a second surface 100 that is opposite the first surface 95 and that is arranged to face inward toward the product display area 40. In other words, the first surface 95 is an outside surface relative to the product display area 40, and the second surface 100 is an inside surface relative to the product display area 40.

The second glass panel 75 is positioned between and adjacent the first glass panel 70 and the third glass panel 80, and is formed from an annealed transparent or translucent glass. Alternatively, the second glass panel 70 can be formed of a variety of other materials including polycarbonate, acrylic, vinyl, or combinations thereof. The second glass panel 75 has a third surface 105 that is arranged to face the second surface 100 of the first glass panel 70, and a fourth surface 110 that is opposite the third surface 105 and that is arranged to face inward toward the product display area 40. In other words, the third surface 105 is an outside surface relative to the product display area 40, and the fourth surface 110 is an inside surface relative to the product display area 40.

The third glass panel 80 is positioned adjacent the second glass panel 75 and is also adjacent and in communication with the conditioned product display area 40 (e.g., a case-side glass panel). The third glass panel 80 is formed from a tempered transparent or translucent glass. Alternatively, the third glass panel 70 can be formed of a variety of other materials including polycarbonate, acrylic, vinyl, or combinations thereof. The third glass panel 80 has a fifth surface 115 that is arranged to face the fourth surface 110 of the second glass panel 75 and a sixth surface 120 that is opposite the fifth surface 115 and that is arranged to face inward toward the product display area 40. In other words, the fifth surface 105 is an outside surface relative to the product display area 40, and the sixth surface 110 is an inside surface relative to the product display area 40.

The door 35 also includes a first film 125 on the first glass panel 70, a second film 130 on the second glass panel 75, and a third film 135 on the third glass panel 80. Generally, the films 125, 130, 135 are transparent films that can be coupled to or adhered to the respective glass panels 70, 75, 80 in any suitable manner (e.g., a metallic pyrolytic coating, a magnetic sputter vacuum deposition coating, etc.). In some constructions, one or more of the respective films 125, 130, 135 may cover less than the entire surface of one or more of the corresponding glass panels 70, 75, 80.

The first film 125 covers the second surface 100 of the first glass panel 70 and includes a split silver low-emissivity coating to reflect radiated energy of the ambient environment from the first glass panel 70. The second film 130 covers the fourth surface 110 of the second glass panel 75 and includes a split silver low-emissivity coating to reflect radiated energy from the ambient environment that reaches the second glass panel 75. Generally, split silver low-emissivity coatings provide improved emissivity or reflectivity of heat energy over single silver coatings and pyrolytic-type coatings. Split silver low-emissivity coatings also differ from single silver coatings and pyrolytic-type coatings due to special considerations regarding, for example, materials, handling processes, and manufacturing processes used to form the first film 125 and the second film 130. In other words, the materials, handling processes, and manufacturing processes used with single silver coatings and pyrolytic-type coatings, for example, may be inadequate for providing a glass panel with a split-silver low emissivity coating.

The third film 135 covers the fifth surface 115 and includes a low-wattage heated coating (e.g., 92 Watts) to clear fog and condensation that may form on glass assembly 45. The third film 135 is a conductive film that is in electrical communication with a power supply 140 so that electrical energy is applied through the third film 135. The third film 135 is a low-wattage coating that has a sufficient resistance to produce heat, thereby inhibiting formation or initiating removal of condensation or fog on the glass assembly 45 (e.g., on one or more of the first glass panel 70, the second glass panel 75, and the third glass panel 80). The low-wattage third film 135 uses less electrical energy compared to the electrical energy required by conventional high-wattage coatings, resulting in lower energy consumption and cost savings. In some constructions, the third film 135 can be coupled to a controller (not shown) to regulate the electrical energy through the third film 135 to provide a variable amount of heat to the door 35 for efficient use of the supplied energy. Specifically, the electrical energy for this low wattage coating is less than 100 watts, as opposed to known high wattage coatings that require more than 100 watts (e.g., 200 watts).

Condensation generally forms on the glass assembly 45 when the temperature of a surface of the glass assembly 45 is lower than a dew point of air that is in contact with the surface. Condensation is a result of a combination of surface temperature and moisture in the surrounding air, and condensation can form on the first surface 95, for example, when the temperature of the first surface 95 is below the dew point of the ambient air of the surrounding environment (e.g., when the ambient environment is approximately 80 degrees Fahrenheit and 60 percent relative humidity). Condensation also can form on the sixth surface 120 after the door 35 has been opened due to exposure of the generally cold sixth surface 120 (due to the close proximity of the sixth surface 120 to the product display area 40) to generally warm conditions in the ambient environment. Condensation may also form on other surfaces of the glass assembly 45 depending on heat transfer paths that exist through and within the glass assembly 45.

The first film 125 and the second film 130 cover the inside surfaces 100, 110 of the respective glass panels 70, 75 to limit or inhibit formation of condensation on the outside surfaces 95, 105 by reflecting radiated energy from the ambient environment. The first film 125 on the second surface 100 reflects at least some of the radiated energy in the ambient environment adjacent the door 35 to limit radiant heat transfer through the glass assembly 45. The second film 130 on the fourth surface 110 cooperates with the first film 125 to further reflect radiated energy from the ambient environment to limit condensation on the glass assembly 45. By reflecting the radiated energy using the split silver low-emissivity films 125, 130 covering the glass panels 70, 75, the amount of radiant energy that is reflected by the glass assembly 45 increases relative to conventional glass doors, substantially limiting formation of condensation on either or both of the first surface 95 and the third surface 105.

By reflecting all or substantially all of the radiated energy from the ambient environment using the first and second films 125, 130, the sixth surface 120 has a temperature (e.g., 3 degrees Fahrenheit to −7 degrees Fahrenheit) that is generally close to the temperature of air in the product display area 40 because very little heat, if any, from the ambient environment reaches the sixth surface 120. The relatively cold sixth surface 120 is susceptible to fog formation when the door 35 is opened and exposed to the ambient environment. Heat is applied to the fifth surface 115 via the third film 135 to remove any fog that may form on the sixth surface 120.

Heat from the third film 135 removes fog on the sixth surface 120 without directly heating the product display area 40. In addition, heat from the third film 135 does not reach the first surface 95 of the first glass panel 70 due to the respective split silver low-emissivity films 125, 130 on the second and fourth surfaces 100, 110. By focusing the heat from the third film 135 on the third glass panel 80 using the first and second films 125, 130, the relatively low wattage third film 135 removes fog from the sixth surface 120 in a relatively short timeframe (e.g., one minute after a six minute door-opening event).

The third film 135 cooperates with the first film 125 and the second film 130 by providing heat energy to eliminate any condensation and fog that may form on one or more of the surfaces 95, 100, 105, 110, 115, 120. The third film 135 reduces the amount of electrical energy needed to clear any condensation without increasing the amount of time needed to remove the condensation. The third film also substantially limits formation of and clears condensation and fog on the first surface 95 of the first glass panel 70 and the sixth surface 120 of the third glass panel 80.

Various features and advantages of the invention are set forth in the following claims.

The invention claimed is:

1. A door for a refrigerated merchandiser defining a product display area, the door comprising:
   a glass assembly including
      a first glass panel configured to be in communication with an environment surrounding the refrigerated merchandiser, the first glass panel having a first surface arranged to face the environment and a second surface opposite the first surface,
      a second glass panel positioned adjacent the first glass panel, the second glass panel having a third surface arranged to face the second surface and a fourth surface opposite the third surface, and
      a third glass panel positioned adjacent the second glass panel and configured to be in communication with the product display area, the third glass panel having a fifth surface arranged to face the fourth surface and a sixth surface opposite the fifth surface and arranged to face the product display area; and
   a split-silver low-emissivity coating covering at least a portion of the third surface or the fourth surface; and
   a conductive film covering at least a portion of the fifth surface or the sixth surface, the conductive film configured to be connected to a power supply to heat the third glass panel and to at least one of inhibit and remove condensation on at least one of the first glass panel and the third glass panel.

2. The door of claim 1, wherein the door further includes a low-emissivity film covering at least a portion of the first surface or the second surface.

3. The door of claim 2, wherein the low-emissivity film covers at least a portion of the second surface.

4. The door of claim 1, wherein the split-silver low-emissivity coating covers at least a portion of the fourth surface.

5. The door of claim 4, wherein the conductive film covers at least a portion of the fifth surface.

6. A refrigerated merchandiser comprising:
   a case defining a product display area for supporting food product;
   a power supply;
   a refrigeration system in communication with the case; and
   a door coupled to the case, the door including
      a glass assembly having a first glass panel in communication with an ambient environment surrounding the case, a second glass panel, and a third glass panel in communication with the product display area such that the second glass panel is positioned between the first glass panel and the third glass panel,
      a split-silver low-emissivity coating covering at least a portion of the second glass panel, and
      a conductive film covering at least a portion of the third glass panel,
   wherein the conductive film is in electrical communication with the power supply to heat the third glass panel and inhibit or remove condensation on one or both of the first glass panel and the third glass panel.

7. The refrigerated merchandise of claim 6, wherein the first glass panel includes a first surface arranged to face the ambient environment and a second surface opposite the first surface, and wherein the door further includes a low-emissivity film covering at least a portion of the first surface or the second surface.

8. The refrigerated merchandise of claim 7, wherein the low-emissivity film covers at least a portion of the second surface.

9. The refrigerated merchandise of claim 8, wherein the second glass panel includes a third surface arranged to face the second surface, and a forth surface opposite the third surface and, wherein the split-silver low-emissivity coating covers at least a portion of the fourth surface.

10. The refrigerated merchandiser of claim 9, wherein the third glass panel includes a fifth surface arranged to face the forth surface and a sixth surface opposite the fifth surface and arranged to face the product display area, and wherein the conductive film covers at least a portion of the fifth surface.

11. The refrigerated merchandise of claim 6, wherein each of the first glass panel and the third glass panel includes tempered glass, and wherein the second glass panel includes annealed glass.

12. A method of manufacturing a door for a refrigerated merchandiser defining a product display area and positioned in an ambient environment, the door including a first glass panel, a second glass panel, and a third glass panel, the method comprising:
   covering at least a portion of the second glass panel with a split-silver low-emissivity coating configured to reflect radiated energy; and
   covering at least a portion of the third glass panel with a conductive film, the conductive film configured to heat at least the third glass panel,
   wherein the second glass panel is positioned between and spaced from the first glass panel and the third glass panel such that the first glass panel is configured to be exposed to the ambient environment and the third glass panel is configured to be exposed to the product display area.

13. The method of claim 12, further comprising covering at least a portion of the first glass panel of the door with a low-emissivity film configured to reflect radiated energy.

14. The method of claim 13, wherein the first glass panel has a first surface configured to be in communication with the ambient environment and a second surface opposite the first surface, the method further comprising covering the second surface with the low-emissivity film.

15. The method of claim 14, wherein the second glass panel has a third surface facing the second surface and a fourth surface opposite the third surface, the method further comprising covering the fourth surface with the split-silver low-emissivity coating.

16. The method of claim 15, wherein the third glass panel has a fifth surface facing the fourth surface and a sixth surface opposite the fifth surface and configured to be in communication with the product display area, the method further comprising covering the fifth surface with the conductive film.

17. The method of claim 16, further comprising
   assembling the first, second, and third glass panels onto a refrigerated merchandiser; and
   inhibiting or removing moisture on the first glass panel or the third glass panel.

* * * * *